O. C. EDWARDS, Jr.
CAISSON.
APPLICATION FILED DEC. 13, 1906.
1,013,870.
Patented Jan. 9, 1912.
9 SHEETS—SHEET 1.
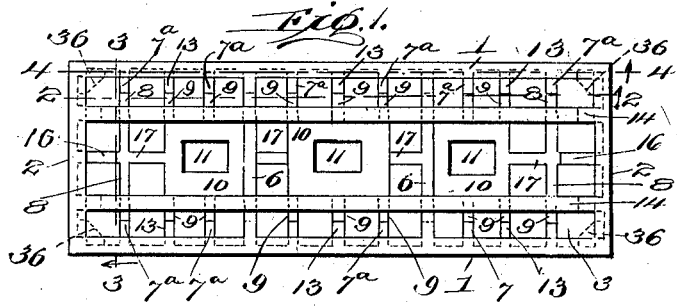
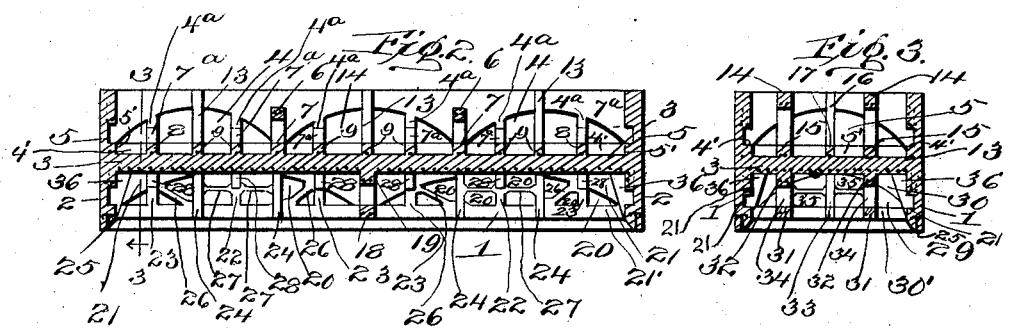
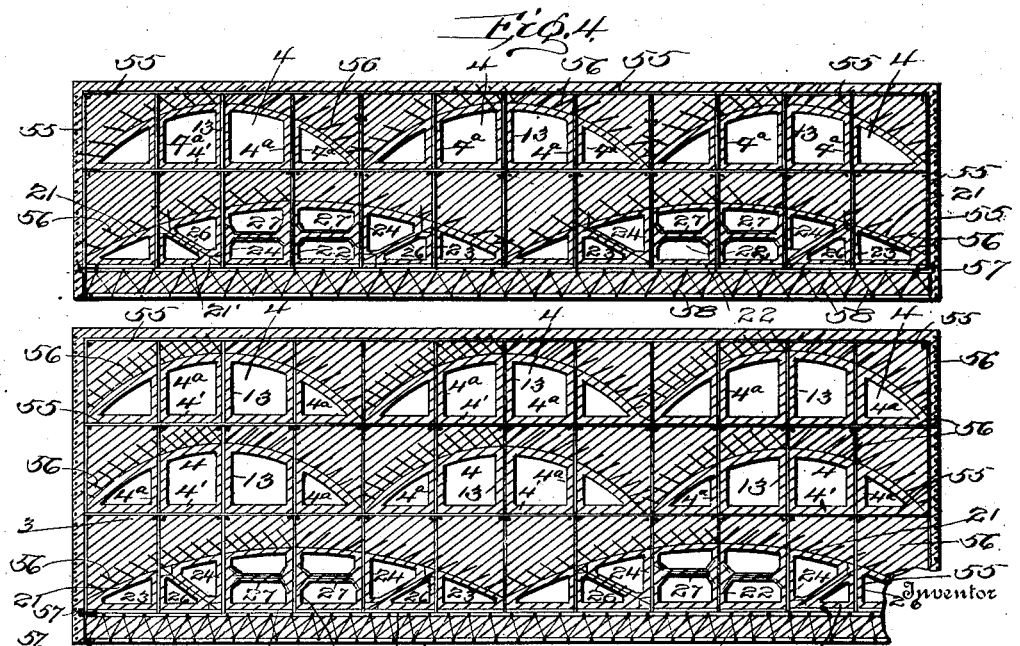
Witnesses
J. M. Fowler
Edgar M. Kitchin
Inventor
Oliver C. Edwards, Jr.
By Mason, Fenwick & Lawrence
his Attorneys O. C. EDWARDS, Jr.
CAISSON.
APPLICATION FILED DEC. 13, 1906.
1,013,870.
Patented Jan. 9, 1912.
9 SHEETS—SHEET 2.
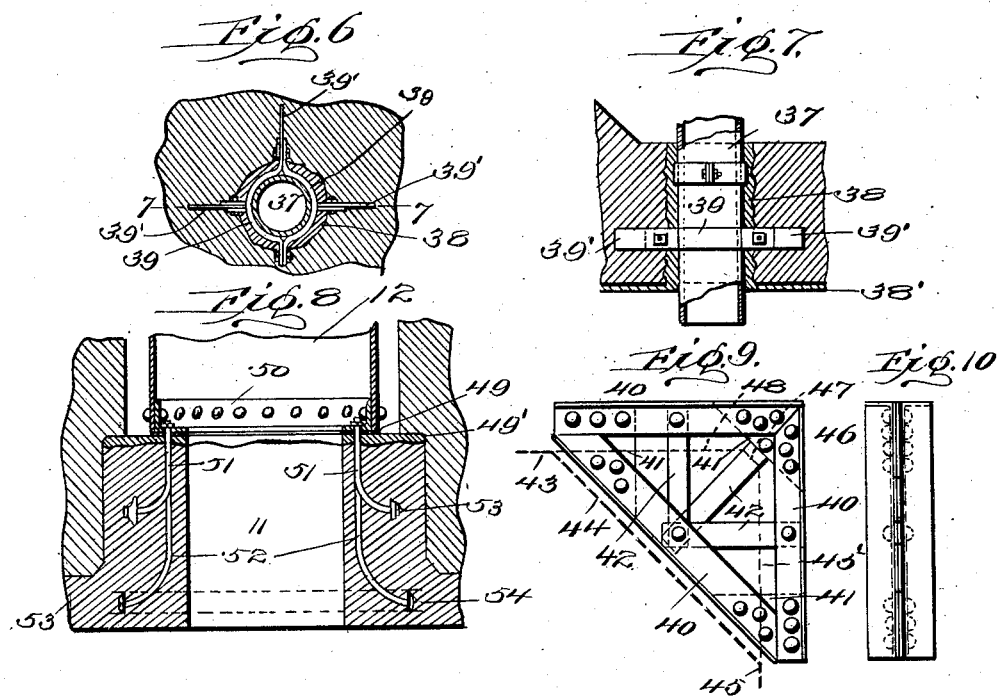
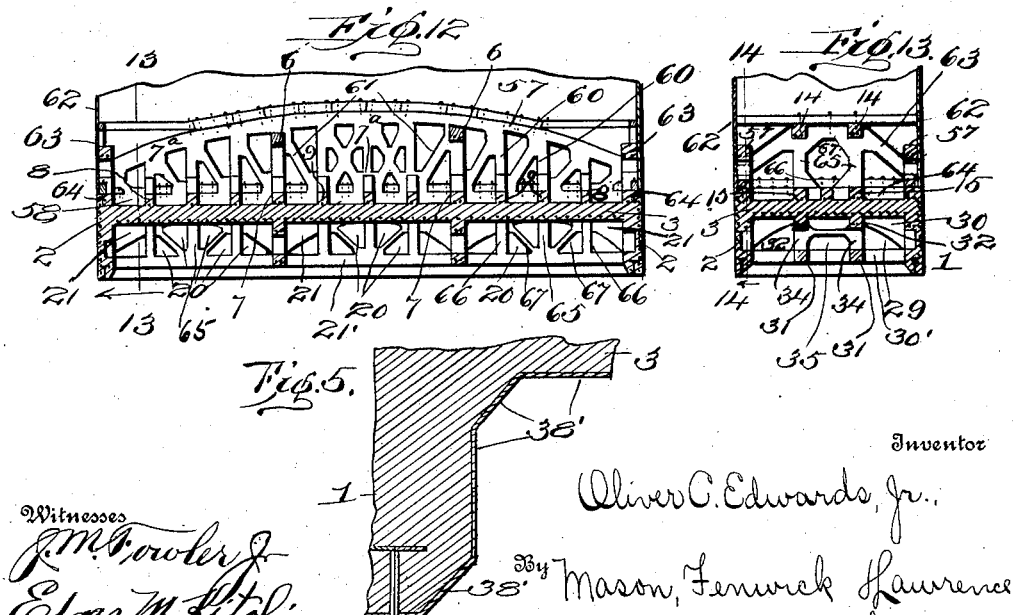

O. C. EDWARDS, Jr.
CAISSON.
APPLICATION FILED DEC. 13, 1906.
1,013,870.
Patented Jan. 9, 1912.
9 SHEETS—SHEET 3.
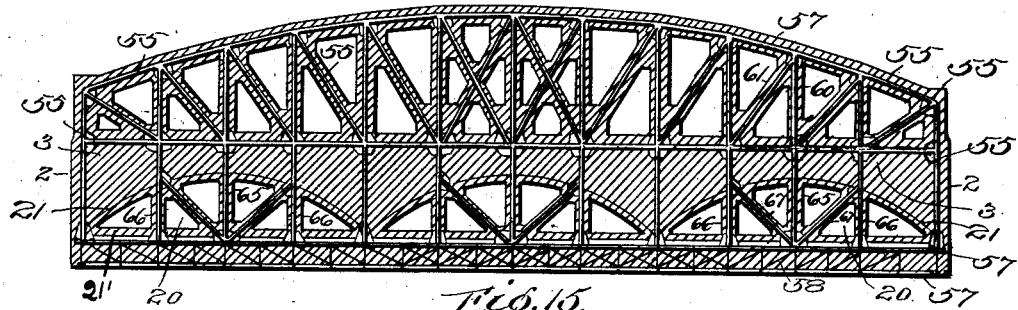
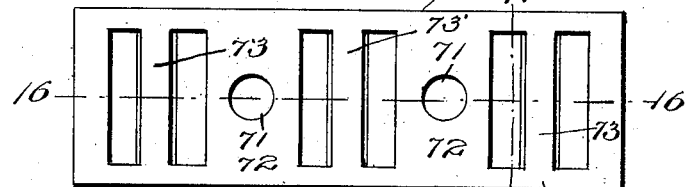
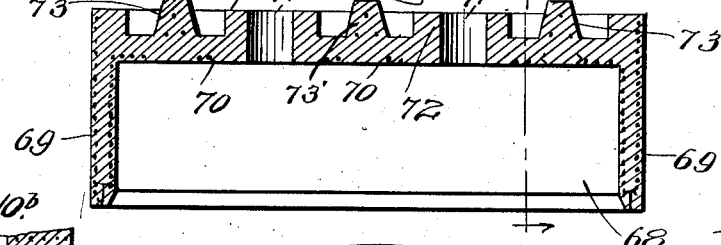
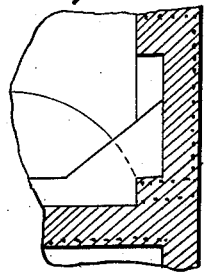
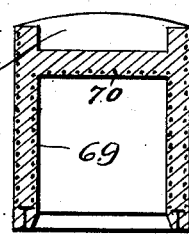
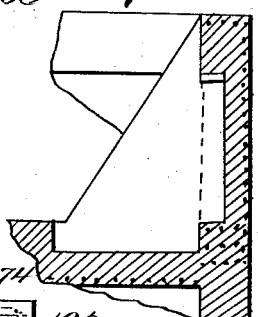
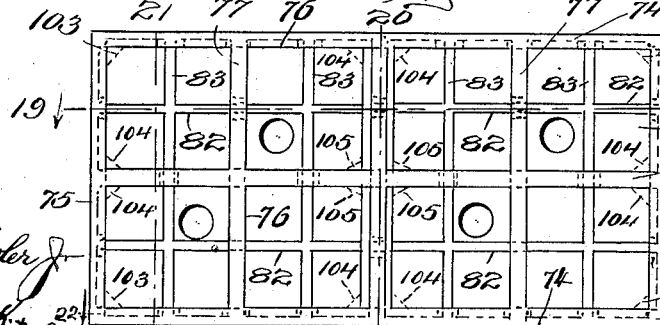

O. C. EDWARDS, Jr.
CAISSON.
APPLICATION FILED DEC. 13, 1906.
1,013,870.
Patented Jan. 9, 1912.
9 SHEETS—SHEET 4.
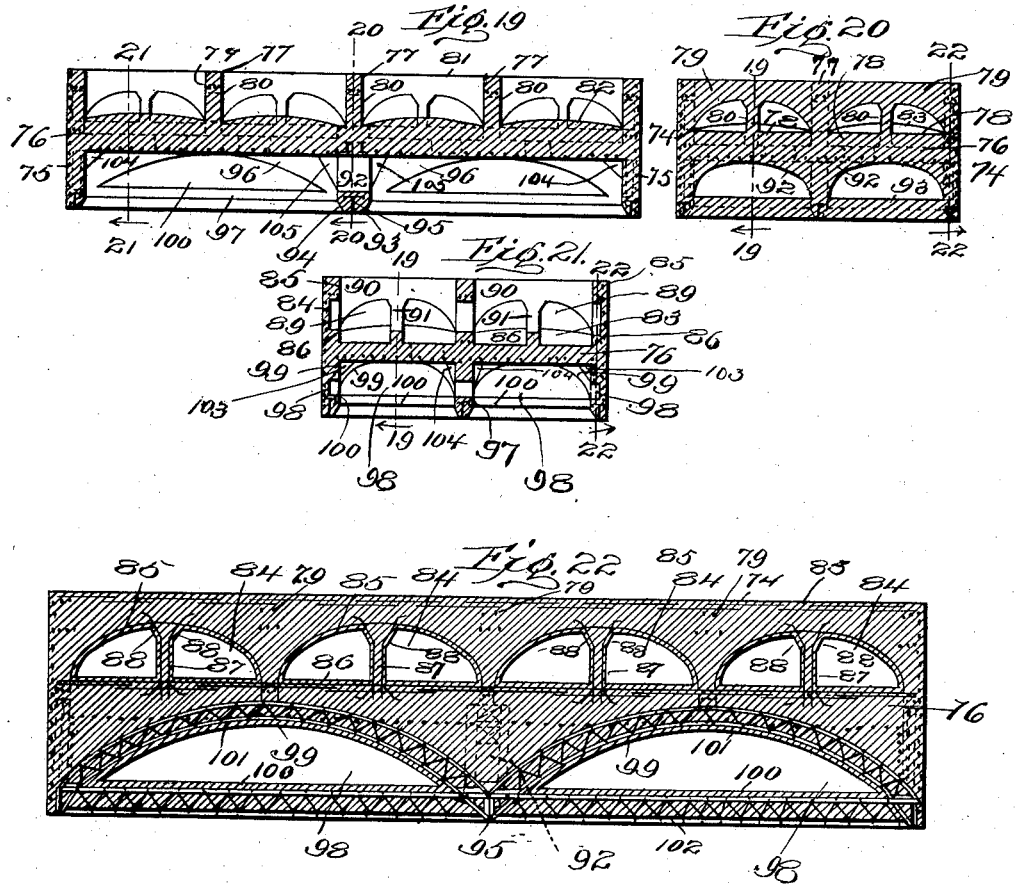
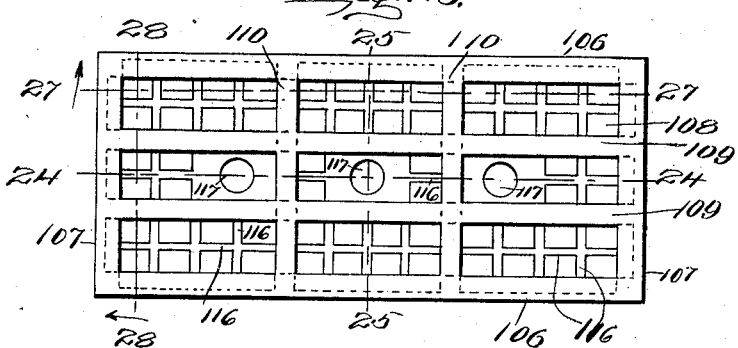

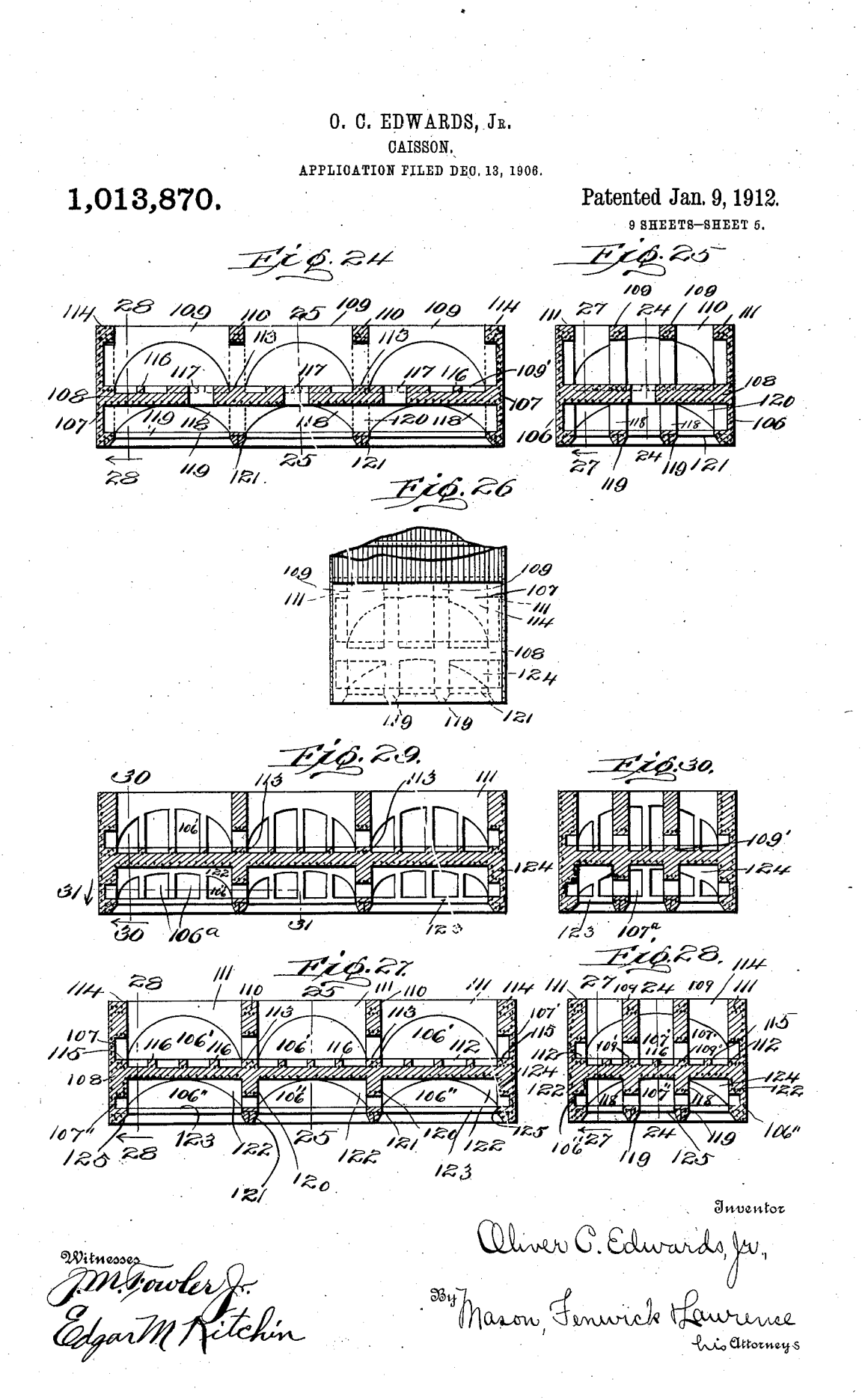

O. C. EDWARDS, Jr.
CAISSON.
APPLICATION FILED DEC. 13, 1906.

1,013,870.

Patented Jan. 9, 1912.

9 SHEETS—SHEET 5.

O. C. EDWARDS, Jr.
CAISSON.
APPLICATION FILED DEC. 13, 1906.
1,013,870.
Patented Jan. 9, 1912.
9 SHEETS—SHEET 6.
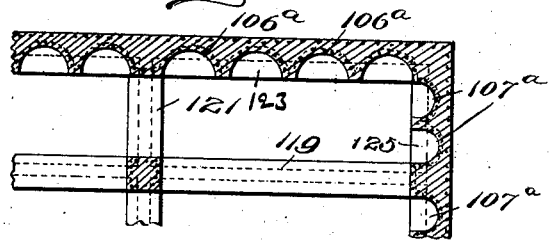
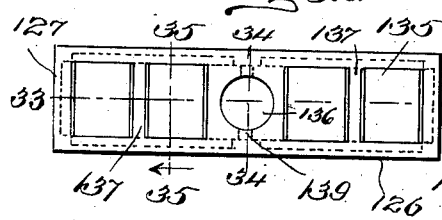 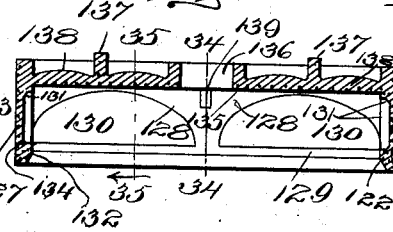 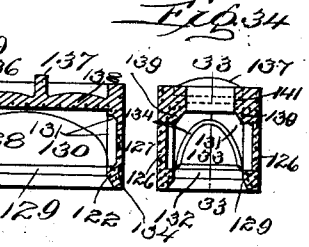
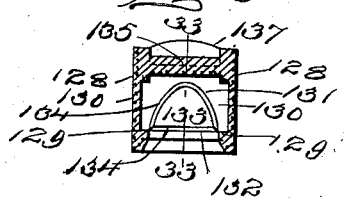 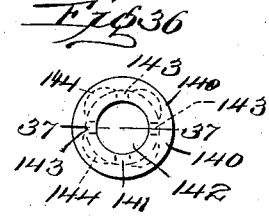 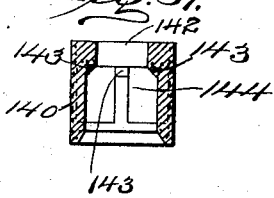
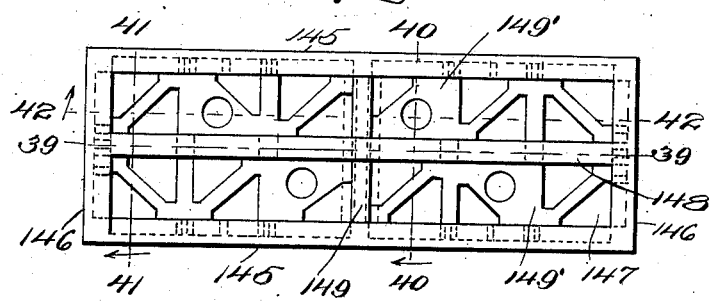

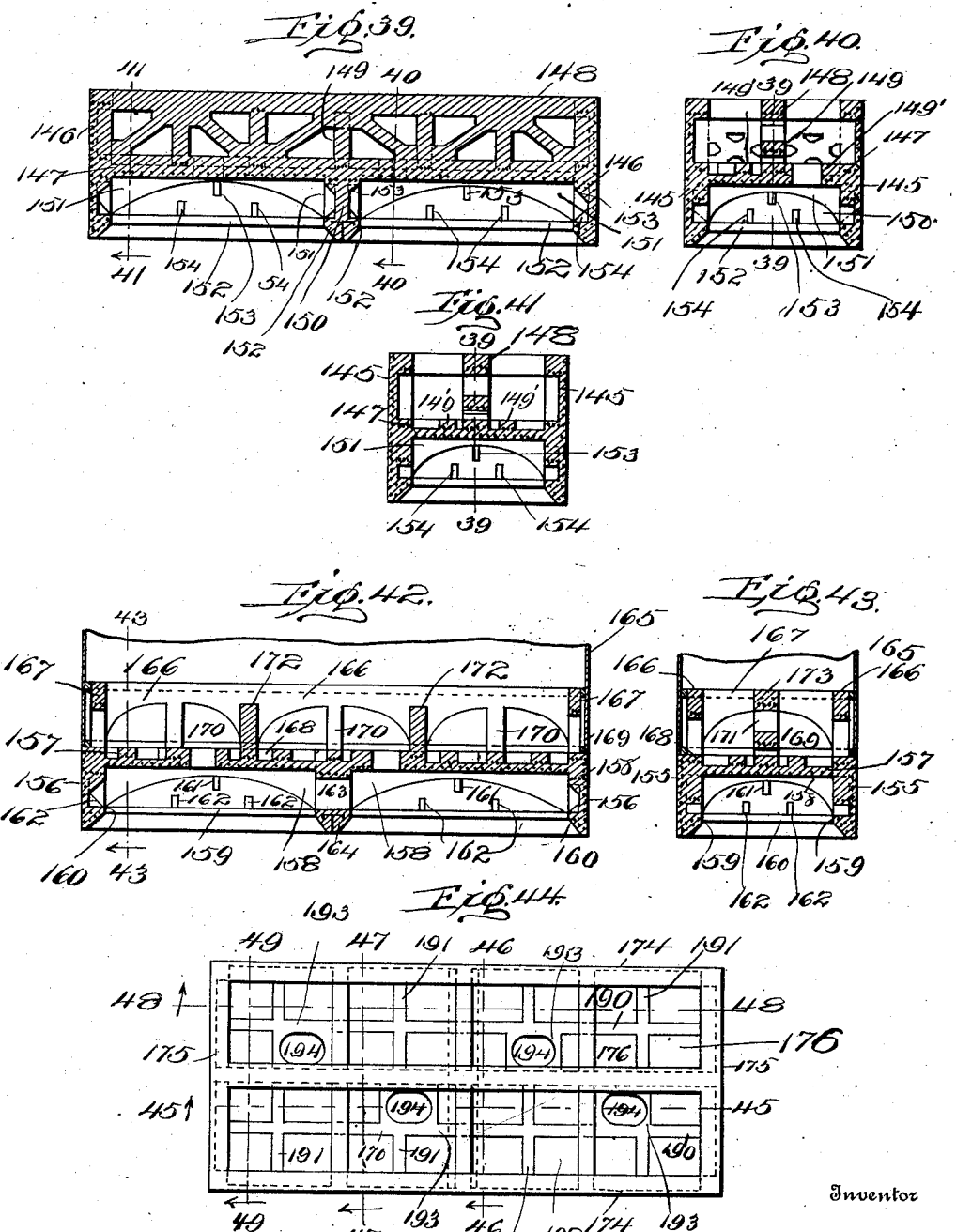

O. C. EDWARDS, Jr.
CAISSON.
APPLICATION FILED DEC. 13, 1906.
1,013,870.
Patented Jan. 9, 1912.
9 SHEETS—SHEET 8.
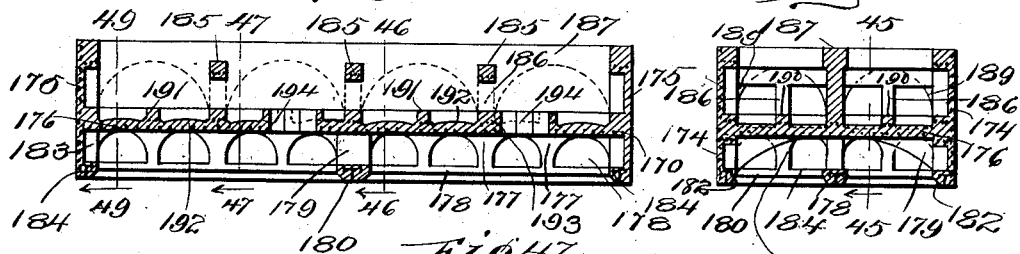
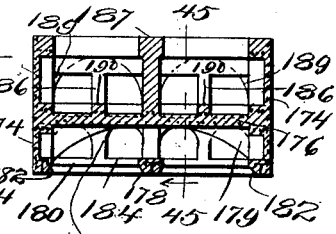
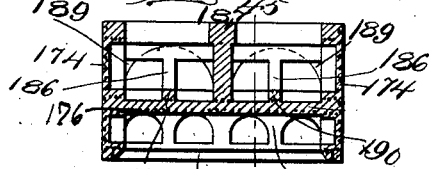
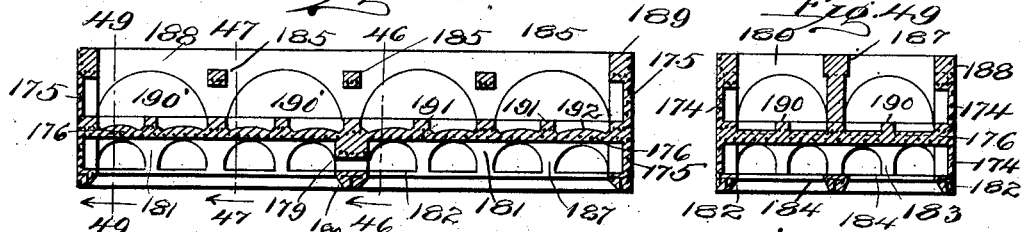
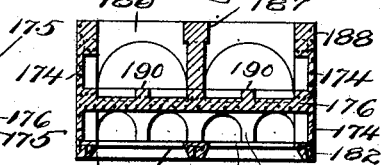
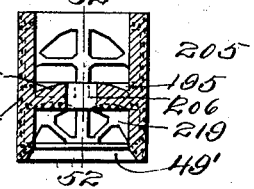
Witnesses
J. M. Fowler Jr.
Edgar M. Kitchin
Inventor
Oliver C. Edwards, Jr.
By Mason, Fenwick & Lawrence
his Attorneys O. C. EDWARDS, Jr.
CAISSON.
APPLICATION FILED DEC. 13, 1906.
1,013,870.
Patented Jan. 9, 1912.
9 SHEETS—SHEET 9.
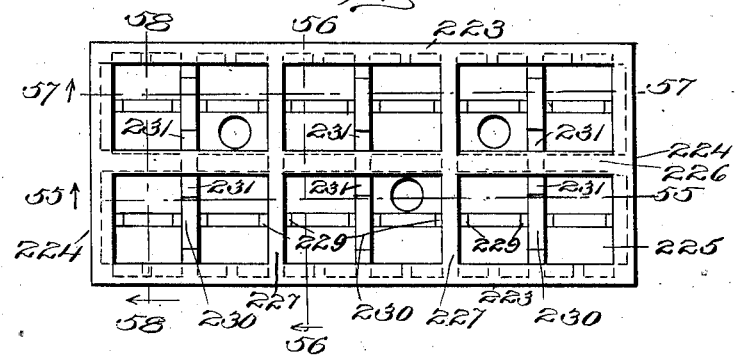
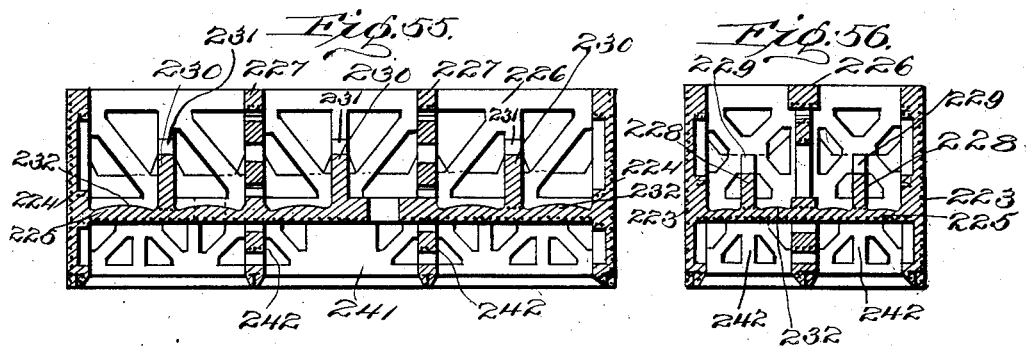
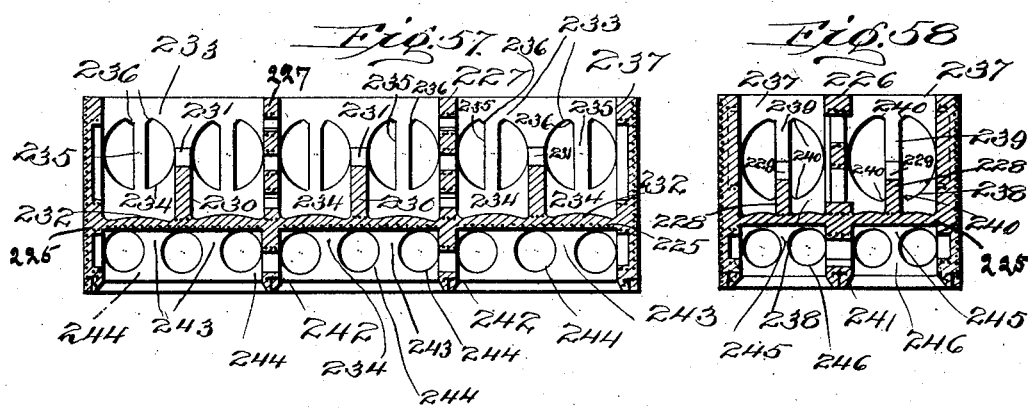
Witnesses
J. M. Fowler
Edgar M. Kitchin
Inventor
Oliver C. Edwards, Jr.
By Mason, Fenwick & Lawrence
his Attorneys

UNITED STATES PATENT OFFICE.

OLIVER CROMWELL EDWARDS, JR., OF TROY, NEW YORK.

CAISSON.

1,013,870.  Specification of Letters Patent.  Patented Jan. 9, 1912.

Application filed December 13, 1906. Serial No. 347,686.

*To all whom it may concern:*

Be it known that I, OLIVER C. EDWARDS, Jr., C. E., a citizen of the United States, residing at Troy, in the county of Rensselaer and State of New York, have invented certain new and useful Improvements in Caissons, (Case D;) and I do hereby declare the following to be a full, clear, and exact description of the invention, such as will enable others skilled in the art to which it appertains to make and use the same.

This invention relates to caissons, and more particularly to the composite type.

The object in view is the reduction in expense and increase in strength and efficiency, these and other objects being attained by the employment in combination with concrete-inclosing walls, of arched concrete braces therefor.

The invention comprises certain novel constructions, combinations and arrangements of parts as will be hereinafter fully described and claimed.

In the accompanying drawing: Figure 1 is a top plan view of one of the simplest forms of caisson embodying the features of the present invention. Fig. 2 is a longitudinal, vertical section taken on the plane indicated by line 2—2 of Fig. 1, and looking in the direction indicated by the arrow. Fig. 3 is a transverse vertical section taken on the plane indicated by line 3—3 of Figs. 1 and 2 and looking in the direction indicated by the arrow. Fig. 4 is a longitudinal, vertical section taken on the plane indicated by line 4—4 of Fig. 1, and looking in the direction indicated by the arrow. Fig. 5 is an enlarged, detail, fragmentary view of a portion of the wall of a caisson working chamber illustrating in detail the mortar coat employed for preventing the escape of air under pressure. Fig. 6 is an enlarged, detail, fragmentary view showing one of the air pipes in horizontal section, the support for the air pipe embedded in the wall or roof being illustrated in plan, and the mortar coat which is employed for preventing the escape of compressed air being illustrated. Fig. 7 is a horizontal section taken on the plane indicated by line 7—7 of Fig. 6, parts being illustrated in elevation. Fig. 8 is an enlarged, detail, fragmentary, vertical section taken through the lower portion of one of the spoil or man shafts and surrounding portions of the working chamber roof. Fig. 9 is a view in side elevation of a metallic reinforcement for a knee brace, such as is employed at various points in the caisson, the dotted lines in the figure indicating the outline of the concrete. Fig. 10 is an edge view of the same. Fig. 10ᵃ is a vertical section taken longitudinally of the caisson through one of the end walls and indicating a fragment of the surrounding parts, the section being taken just at one side of one terminal of the central, longitudinal roof beam indicating the terminal knee brace thereof in elevation. Fig. 10ᵇ is a vertical section taken transversely of the caisson through one of the side walls thereof at one side of one of the transverse roof beams indicating the terminal knee brace thereof in elevation, fragments of the surrounding parts being disclosed. Fig. 11 is a longitudinal vertical section similar to Fig. 4, of a slightly modified form of caisson. Fig. 12 is a longitudinal, vertical section similar to Fig. 2 of a still further modified form of caisson. Fig. 13 is a transverse vertical section taken on the plane indicated by line 13—13 of Fig. 12, and looking in the direction indicated by the arrow. Fig. 14 is a longitudinal, vertical section through the structure seen in Figs. 12 and 13, taken on the plane indicated by line 14—14 of Fig. 13, and looking in the direction indicated by the arrow. Fig. 15 is a top plan view of a further modification. Fig. 16 is a longitudinal, vertical, central section thereof, taken on the plane of line 16—16 of Fig. 15. Fig. 17 is a transverse, vertical section, taken on the plane indicated by line 17—17 of Figs. 15 and 16, and looking in the direction indicated by the arrow. Fig. 18 is a top plan view of another modification. Fig. 19 is a longitudinal, vertical section taken on the plane indicated by line 19—19 of Figs. 18, 20 and 21, looking in the direction of the arrow. Fig. 20 is a transverse, vertical section taken on the plane indicated by line 20—20 of Figs. 18 and 19, looking in the direction of the arrow. Fig. 21 is a transverse, vertical section taken on the plane indicated by line 21—21 of Figs. 18 and 19, looking in the direction of the arrow. Fig. 22 is a longitudinal, vertical section taken on the plane indicated by line 22—22 of Figs. 18, 20 and 21, looking in the direction of the arrow. Fig. 23 is a top plan view of another modification. Fig. 24 is a longitudinal, vertical, central section taken on the plane indicated by line 24—24 of Figs. 23, 25 and 28. Fig. 25 is a transverse, vertical central section taken on the plane indicated by line 25—25 of Figs. 23, 24 and 27. Fig. 26 is a view in end elevation of the structure seen in plan in Fig. 23, a fragment of a wooden coffer-dam being indicated as mounted on the caisson. Fig. 27 is a longitudinal, vertical section taken on the plane indicated by line 27—27 of Figs. 23, 25 and 28, looking in the direction indicated by the arrow. Fig. 28 is a transverse vertical section taken on the plane indicated by line 28—28 of Figs. 23, 24 and 27, looking in the direction indicated by the arrow. Fig. 29 is a longitudinal, vertical section through another modification whose top plan would appear the same as Fig. 23, the section being taken on a plane equivalent to line 27—27 of Fig. 23 looking in the direction of the arrow. Fig. 30 is a transverse vertical section through the same taken on the plane indicated by line 30—30 of Fig. 29, and looking in the direction indicated by the arrow. Fig. 31 is a horizontal, fragmentary section taken on the plane indicated by line 31—31 of Fig. 29 looking downwardly. Fig. 32 is a top plan view of a further modified form of caisson. Fig. 33 is a longitudinal, central vertical section taken on the plane of line 33—33 of Figs. 32, 34 and 35. Fig. 34 is a transverse vertical, central section taken on the plane indicated by line 34—34 of Fig. 32 and 33. Fig. 35 is a similar vertical section taken on the plane indicated by line 35—35 of Figs. 32 and 33, looking in the direction indicated by the arrow. Fig. 36 is a top plan of another modified form of caisson. Fig. 37 is a vertical, central section therethrough taken on the plane indicated by line 37—37 of Fig. 36. Fig. 38 is a top plan view of another modified form of caisson. Fig. 39 is a longitudinal, vertical, central section taken on the plane indicated by line 39—39 of Figs. 38, 40 and 41. Fig. 40 is a transverse vertical section taken on the plane indicated by line 40—40 of Figs. 38 and 39, looking in the direction indicated by the arrow. Fig. 41 is a similar vertical section taken on the plane indicated by line 41—41 of Figs. 38 and 39 looking in the direction indicated by the arrow. Fig. 42 is a longitudinal, vertical section through a further modified form of caisson, the top plan view of which would be the same as Fig. 38, the section being taken on the plane indicated by line 42—42 of Fig. 38, looking in the direction of the arrow. Fig. 43 is a transverse, vertical section taken on the plane indicated by line 43—43 of Fig. 42, looking in the direction of the arrow. Fig. 44 is a top plan view of another modified form of caisson. Fig. 45 is a longitudinal, vertical section taken on the plane indicated by line 45—45 of Figs. 44, 46 and 47, looking in the direction indicated by the arrow. Fig. 46 is a transverse, vertical section taken on the plane indicated by line 46—46 of Figs. 44, 45 and 48, looking in the direction indicated by the arrow. Fig. 47 is a transverse, vertical section taken on the plane indicated by line 47—47 of Figs. 44, 45 and 48, looking in the direction indicated by the arrow. Fig. 48 is a longitudinal, vertical section taken on the plane indicated by line 48—48 of Fig. 44, looking in the direction indicated by the arrow. Fig. 49 is a transverse, vertical section taken on the plane indicated by line 49—49 of Figs. 44, 45 and 48, looking in the direction indicated by the arrow. Fig. 50 is a top plan view of another modified form of caisson. Fig. 51 is a transverse, vertical sectional view taken on the plane indicated by line 51—51 of Figs 50 and 52, looking in the direction indicated by the arrow. Fig. 52 is a longitudinal, vertical, central section taken on the plane indicated by line 52—52 of Figs. 50, 51 and 53. Fig. 53 is a transverse, vertical, central section taken on the plane indicated by line 53—53 of Figs. 50 and 52. Fig. 54 is a top plan view of another modified form of caisson. Fig. 55 is a longitudinal, vertical section taken on the plane indicated by line 55—55 of Fig. 54, looking in the direction indicated by the arrow. Fig. 56 is a transverse, vertical section taken on the plane indicated by line 56—56 of Fig. 54, looking in the direction indicated by the arrow. Fig. 57 is a longitudinal, vertical section taken on the plane indicated by line 57—57 of Fig. 54, looking in the direction indicated by the arrow. Fig. 58 is a transverse, vertical section taken on the plane indicated by line 58—58 of Fig. 54 and looking in the direction indicated by the arrow.

By the present invention, I propose to attain certain desirable results in concrete caisson construction by reducing the amount of material required and at the same time increasing the capacity for resisting strains of all forms. These results are largely obtained by the employment of arched braces throughout the caisson structure, and as the strength of an arch is already fully recognized, the value of the use of the same in a concrete caisson will be appreciated. The thrust of the arches, due to the effect of the weight of the caisson, the coffer dam load, etc., is resisted by suitable tie rods, bars, etc., hereinafter fully described, and the arches are preferably provided with embedded metallic reinforcements near the intrados thereof, giving tensile strength to the concrete. Some of these reinforcements assume the form of radiating lines which are designed to resist the shearing strain in the concrete of the arches. In this connection, it is to be observed that in referring to concrete hereinafter, I mean any of the compositions now recognized as concrete, or any substitute therefor, and of course it is understood that any tie rods or binding means may be embedded in the concrete, as desired, for increasing the strength of the parts.

Referring to the drawings and particularly to Figs. 1 to 10, inclusive, 1—1 indicate side walls and 2—2 end walls of the caisson, the working chamber of which is completed by a roof 3, which is formed integral with the side and end walls 1 and 2. The said side and end walls extend above the roof 3 a sufficient distance for producing a coffer dam. It is, of course, obvious that the coffer dam may be extended to any height desired, or if preferred a wood coffer dam may be built upon the upper edges of the walls 1 and 2. Each of the side walls 1 above the roof 3 is formed with arched panels 4—4. The arched panels 4—4 of each side are arranged in line so that the ends of the arches meet, and all of the ends of the arches are tied together by a chord or beam 4′ formed integral with the side wall and roof, and extending above the roof. As many arches are employed as are required to extend from one end of the caisson to the other, so that the effect produced is that of an arched brace or truss having one of its chords arched, said truss extending from one end of the caisson to the other, and incidentally cast integral with the comparatively thin side wall parallel therewith. The ends 2 are provided with panels 5 similar in construction and arrangement to panels 4, only one panel 5 being seen in the present illustration at one end. The ends of the arch formed by panel 5 has its ends tied together by a chord 5′ for producing an arched truss. It is, of course, obvious that as many arches may be provided as are required, according to the size and shape of the coffer dam structure.

For the purpose of stiffening and strengthening the coffer dam structure, the walls 1 are connected by transverse beams 6—6, spaced above the roof 3, and by transverse beams 7—7 arranged beneath the beams 6—6 and formed integral with the roof.

Cast integral with the sides 1 are posts 4ᵃ, which extend from the soffit of the respective arches to the beam 4′ and are formed integral with the said beam knee-braces 7ᵃ, being formed integral with the posts 4ᵃ, said knee-braces serving to stiffen and strengthen the parts and also to resist inwardly acting strains upon the side walls. Cross roof-beams 8—8 connect some of the knee-braces 7ᵃ—7ᵃ and are formed integral with the roof and with the connected knee-braces. Those knee-braces 7ᵃ which are not connected by the cross beams 8 are formed integral with transversely disposed roof beams 9—9, clearly seen in Fig. 1, which roof beams in turn are formed integral with thickened portions 10—10 of the roof 3. Each of the thickened portions 10—10 of the roof is provided with a central aperture 11, for accommodating spoil and man shafts. A fragment of one of said shafts is seen at 12 in Fig. 8, which will be hereinafter fully described in detail. Each of the walls 1 is provided with comparatively large knee-braces 13 formed integral therewith, one disposed at the crown of each arch, each knee-brace 13 extending from the upper edge of the crown of the respective arch down to and being formed integral with a roof beam 9.

The end walls of the coffer dam are connected by upper, longitudinal beams 14—14 and lower, roof beams 15, the beams 14 being formed integral with the end walls and the beams 15 being formed integral with the end walls and the roof 3, the beams 15 being disposed immediately below the beams 14. The beams 14 and 15, of course, intersect the beams 6 and 7, respectively, and are formed integral therewith at the points of intersection. Each of the end walls 2 of the coffer dam is provided with a knee-brace 16 corresponding in construction and arrangement to the knee-brace 13, said knee-braces 16 being connected by means of a longitudinally disposed roof beam 17, which roof beam is formed integral with the roof and is interrupted at three points in its length by the thickened portions 10. Below the roof 3 is the usual working chamber, and in the said working chamber the side walls 1 are connected by a lower, transverse beam 18, spaced from the roof 3 and an upper roof beam 19, formed integral with said roof 3 and arranged immediately above the beam 18. The side walls 1 in the caisson working chamber are paneled as at 20—20, producing wall arches 21—21 having their ends tied together by a cord 21′. The inner ends of the arches 21 meet centrally of the caisson by preference, but it is, of course, obvious that more than two arches 21 may be provided, and the positions of the ends of the arches would differ accordingly. Each of the arches 21 is stiffened by a centrally disposed, vertical stud 22 and is further stiffened by laterally disposed studs 23—23. Midway between the stud 22 of each arch and each stud 23 there is arranged a knee-brace 24, which is formed integral with the side wall and with the roof 3, and extends from the roof to the cord 21′ tapering downwardly. By preference, inclined braces 26 are interposed between the respective stud 23 and the nearest knee-brace 24, each of the braces 26 being formed integral with the soffit of the arch and with the side wall. A longitudinally disposed horizontal beam 27 connects each of the knee-braces 24 with the central stud 22, each beam 27 being, of course, formed integral with the side walls 1. For the purpose of further stiffening and strengthening the structure, knee-braces 28—28 are formed integral with the roof 3 and with the respective arch 21 and studs 22 and 23.

Each of the end walls 2 of the working chamber is paneled out, as at 29, producing a transversely disposed arch 30, which in the structure illustrated, extends from one side to the other of the working chamber, but it is, of course, obvious that any number of arches may be employed after the manner illustrated in connection with the sides 1. The ends of each arch 30 are tied together by a cord or beam 30' formed integral with the end wall. Longitudinal beams 31—31 connect the end walls 2 near the lower edge thereof, and longitudinal roof beams 32—32 connect said ends above the beams 32, beams 32 being formed integral with the chord 30', the knee-brace extends from the crown of each arch 30, being formed integral with the roof 3 and arch 30, downwardly to and is formed integral with the chord 30', the knee-brace being tapered downwardly and formed integral with the end wall between the arch and chord. The arch is further strengthened by vertical studs 34—34 which are formed integral with the end walls and connect the ends of the respective beams 31 and 32. Horizontal cross beams 35—35 are formed integral with the end walls and connect the studs 34 with the knee-brace 33.

At each corner of the working chamber produced by the meeting of the roof, side and end walls, the parts are connected by a trihedral angular filling 36, each of said fillings 36 tapering from the roof downwardly and terminating approximately at the point of beginning of the bevel of the cutting edge 25. It is noted that the cutting edge 25 is formed by the juncture of the lower edge of the side and end walls with the respective chords 21' and 30', and by the beveling of the said chords 21' and 30' at their lower edges.

It will be obvious that the arches as shown and described serve as means for strengthening the caisson structure, while permitting the use of comparatively thin walls, the arch beams or braces being disposed for taking up strains. It is further obvious that various forms of arches may be provided and various types of braces constructed from arches may be utilized at various points in the caisson and coffer dam structure. The transverse and longitudinal working chamber beams and the transverse and longitudinal coffer dam beams may be formed into braces constructed from one or more arches, as will hereinafter fully appear.

Owing to the reduced scale of Figs. 1 to 4, inclusive, I have omitted to illustrate therein the detail features of construction, and have therefore shown the same in detail in Figs. 6 to 10, inclusive. In Figs. 6 and 7, I have shown an air or other pipe 37. It will, of course, be well understood by those skilled in the art that work is carried on in the working chamber of the caisson while the air in the said chamber is maintained under considerable pressure, and therefore means must be provided for preventing leaking of air past any pipes, rods, wires or other devices entering the working chamber from the outside. Each of said devices is therefore arranged with a coating of mortar between such device and the surrounding concrete, which mortar serves as a bonding means and prevents leakage of air about the particular device surrounded by the mortar. The device illustrated in Figs. 6 and 7 is that of an air pipe which is surrounded by a mass of mortar 38, the pipe 37 being sustained in position by suitable semi-circular webs or bars 39 arranged in pairs, the pair being clamped together in such manner as to firmly grip the pipe 37. Each member of each pair may be provided with a projecting arm 39' at one end, extending into the concrete and serving as a means of support so that the strain caused by the weight of the pipe 37 is taken up by the concrete and does not affect the surrounding mortar 38. In this connection, attention is directed to Fig. 5, which illustrates an enlarged fragment of the working chamber. The concrete walls are not sufficiently air-tight to prevent the escape of compressed air, and I therefore propose to coat the inner surface of the working chamber with a lining of mortar. The coating 38' may be from one-fourth of an inch thick to two or three inches thick, depending upon the air pressure employed in the sinking of the caisson.

Each of the knee-braces above referred to is constructed in any approved manner, and may be stiffened by any suitable reinforcing means, but by preference I employ a metallic knee-brace frame such as I have illustrated in Figs. 9 and 10. The reinforcement for a knee-brace in Figs. 9 and 10 consists of a triangular frame made up of angle plates 40—40 suitably riveted together and connected at the angles by plates or gussets 41—41 which are riveted to the contacting ends of the bars 40. The central portion of the frame is braced by bars 42—42 connecting the upper and side bars 40 with the front bar 40. The said reinforcement in practice is embedded in the concrete so that assuming the structure seen in Fig. 9 to be the reinforcement for one of the knee-braces 28, the dotted line 43 will indicate the inner face of the roof and the dotted line 45 will indicate the inner face of the side wall, dotted line 44 indicating the inner face of the knee-brace. The light dotted line seen at 45' indicates the face of the side wall beyond the knee-brace which unites by a fillet 47 with the inner face of the roof, indicated by the light dotted line 48 at one side of the knee-brace. The reinforcement is thus entirely embedded in the concrete and the openings between the bars 42 and the other parts of the reinforcement permit of thorough bonding of the concrete and a firm retention of the reinforcement in position. Incidentally, it is observed that the knee-brace reinforcement illustrated may be used without being embedded, as a temporary knee-brace, in such instance suitable means being employed for firmly securing the flanges of the angle bars to the wall.

Referring to Fig. 8, the opening 11 in the roof 3 may be of any shape preferred. Arranged about the upper edge of the opening is a layer of mortar 49' supporting a layer, of canvas, cotton wicking, or similar material, 49, which is preferably saturated with white lead or other similar substance. On the layer 49 is mounted an angle iron frame 50 shaped to correspond with the shape of the aperture 11. The shaft 12 is suitably riveted to the frame 50, and the said frame is held in place by means of bolts 51—51 and 52—52. The bolts 51 extend downwardly in the material of the roof and are bent outwardly, and at their outer ends are provided with washers 53 which serve to prevent the bolts from being withdrawn from the concrete. The bolts 52 extend farther down into the material of the roof and engage channel iron frame 54 which is embedded in the material of the roof and surrounds aperture 11. Thus, the shaft 12 is effectually retained in position and the connection to the roof is such that air will not escape between the shaft and the roof. Further, the arrangement of bolts is such that the strain of any slight swaying of the shaft will be distributed throughout the mass of the concrete contiguous to the aperture 11. In smaller structures, where the strain will not be excessive, the bolts 52, may be omitted, but in the larger and heavier structures, said bolts and the channel beam frame 54 are very desirable.

As suggested above and as clearly seen in Fig. 4, the parts of the casing are securely tied together by means of longitudinal, vertical and cross tie rods and bars 55—55. Further than this, each of the arches is strengthened by preferably tangentially disposed stiffening and reinforcing bars or rods 56—56 embedded in the intrados of the arches. The cutting edge 25 of the casing is strengthened by a reinforcement consisting of a metallic open-work truss formed of upper and lower chords 57—57 connected by a web made up of transversely positioned bars 58—58. The bars 58 may be arranged in inclined planes, or some of the same may be inclined while others are disposed vertically, as indicated clearly in Fig. 14.

In Fig. 11 I have illustrated a slightly modified form of caisson, the modification consisting simply in increasing the number of tiers of arches employed in the coffer dam chamber. It is obvious, of course, that as many tiers of arches may be provided as are found necessary for making the concrete coffer dam of the required depth. As the structure seen in Fig. 11 is an exact duplicate of the structures above-described, the same reference numerals are employed, the only difference being a duplication of the coffer dam arches, one tier of arches being superposed upon the other.

In Figs. 12, 13 and 14, I have illustrated another modification wherein each side of the coffer dam is formed of one continuous arch 57. Each of the arches 57 has its imposts or ends tied together by a longitudinal beam 58 extending throughout the span of the arch and formed integral with the roof 3 of the caisson. The arch 57 is stiffened and strengthened by vertical studs 60—60 and inclined braces 61—61 connecting the arch with the beam 58. As seen in Fig. 13, the sides of the coffer dam are sealed against the admission of water by any common form of wooden caisson, 62. The end walls of the coffer dam structure seen in Figs. 12, 13 and 14 are made up simply of single arches 63 having their imposts integral with the imposts of the arches 57. The imposts of each of the arches 63 are connected by a transverse beam 64 extending the full length of the span of the arch and formed integral with roof 3. Each of the arches 63 is connected with its respective chord or beam 64 by vertical studs 65 strengthened by knee-braces 66 at their lower ends and knee-braces 67 at their upper ends.

Each of the arches 63 with its respective beam 64 and the connecting posts constitutes a truss which is of the type commonly known as queen post truss. It is to be observed that each of the arches 57 with its beam 58 and connecting braces constitutes a truss which is of the type known as camelback. The end and side trusses are braced by longitudinal and transverse beams, and by knee-braces similar to the longitudinal and transverse beams of the structure above described, and therefore the same reference numerals have been applied and the same description will apply to these parts.

The working chamber of a caisson of the structure seen in Figs. 12 to 14 inclusive is substantially the same as the working chamber of the structure above described, the principal difference being that there are three arch panels 20, and the arches 21 of said panels are braced slightly differently, a central post or stud 65 being provided for each arch, and extending from the chord 21' up to the crown of the arch. Side posts 66—66 are provided, which extend from the chord 21' up to the roof 3, being, of course, formed integral with the side wall and arch. Inclined braces 67—67 connect the lower ends of studs 65 and the beam or chord 21' with the upper end of posts 66 and with arches 21. The end walls of the working chamber are formed with the panels 29 and arches 30, each of said arches being braced by vertical studs 34—34, spaced apart at suitable distances from the center of the respective end walls. Said studs 34 are connected by the transverse, horizontal brace 35, the knee-brace 33, seen in Fig. 3, being omitted. The transverse and longitudinal bracing means are the same in this structure as above described, and therefore the same reference numerals are employed.

In Figs. 15, 16 and 17, I have illustrated one of the simplest forms of caissons, in which I employ an arched brace for strengthening the parts. The structure shown in said figures consists of a working chamber made up of side walls 68—68 and end walls 69—69, and an integral roof 70. No coffer dam structure is illustrated, but of course it is understood that any suitable coffer dam may be employed. The roof 70 is formed with air and spoil shaft openings 71—71, the roof being strengthened by thickened portions 72—72 at the points of said opening 71. Between each of the thickened portions 72 and its respective end wall is arranged a transverse roof beam 73, each of said roof beams having its upper portion formed in the shape of an arch, the beam being shown as imperforate. Each of the said arched beams extends from one side of the casing to the other and is formed integral with the roof, so as to aid in distributing the strain on the roof to the sides of the caisson. A similar roof beam 73' is arranged centrally between the two thickened portions 72. It is, of course, obvious that each of the roof beams 73 and 73' might be formed with open-work dividing the same into an arch proper and a stringer or beam connecting the imposts thereof, and that as many of the beams 73 and 73' may be used as desired.

In Figs. 18, 19, 20, 21 and 22, I have illustrated another embodiment of the invention. In this embodiment, I employ the usual side walls 74—74 and end walls 75—75 and roof 76, which latter is formed integral with the sides and ends, said sides and ends projecting above the roof for producing a coffer dam. The side walls are connected in the coffer dam by transverse braces 77—77, each made up, as best seen in Fig. 20, of a chord or roof beam 78 and arches 79—79. The arches meet centrally of the coffer dam so as to produce a continuous brace from one side of the coffer dam to the other, and said arches are stiffened by vertical posts 80—80, one post 80 being provided for each arch and extending from the beam or chord 78 up to and being formed integral with the crown of the arch. The roof is further strengthened and stiffened by a centrally disposed longitudinal truss 81, which intersects the trusses 77—77, and is constructed exactly like each of the trusses 77, except that, as seen in Fig. 19, four arches are provided instead of two, one arch extending from one end wall to the first transverse truss 77, the second arch extending from the first transverse truss 77 to the second transverse truss 77, the third arch extending from the second transverse truss 77 to the third transverse truss 77, and the fourth arch extending from the third transverse truss 77 to the opposite end wall. The roof is still further strengthened and stiffened by longitudinal roof beams 82—82 formed integral with the roof and extending from end to end of the coffer dam, each of said beams being also formed integral with the roof beams or chords of the transverse trusses and said roof beams, as clearly seen in Fig. 19, being crowned or formed in the shape of a series of arches. A number of transverse roof beams 83—83 connect the sides of the coffer dam, and each of said beams 83 is constructed exactly like the beams 82, the beams 83 being formed integral with the beams 82 at the points of intersection and being formed integral with the lower beam or chord of the truss 81 at the point of intersection therewith.

As clearly seen in Fig. 22, each of the side walls 74 is formed with panels 84—84 producing arches 85—85. The arches 85 are arranged in line and are formed integral with each other so as to produce a continuous longitudinal brace arranged to stiffen and strengthen the coffer dam, and all of said arches on one side have their ends or imposts tied together by a chord or longitudinal roof beam 86. Each of said arches is further stiffened and strengthened by a centrally disposed vertical stud or post 87 which rises from the chord 86 and extends to and is formed integral with the crown of the arch, each post 87 being provided with knee-braces 88—88 at the point of juncture with the crown of the arch.

Each of the end walls is constructed similarly to the side walls, except that only two arches are employed instead of four. As seen in Fig. 21, each end is formed with panels 89—89 forming arches 90, 90 which are stiffened by the vertical studs 91—91 similar in construction and arrangement to studs 87.

The working chamber beneath the roof 76 is provided with a single transverse truss made up of arches 92—92 having their meeting ends formed integral and all of their ends connected by an integral chord or beam 93, the ends of the meeting arches being formed integral with the beam 93. The beam 93 is formed with a cutting edge 94 stiffened by a metallic reinforcement 95. The working chamber is also provided with a longitudinal truss made up of arches 96—96 meeting centrally of the working chamber and having their inner ends formed integral with the inner ends of the arches 92, a longitudinal chord or beam 97 connecting the ends of the arches 96. The beam or chord 97 is formed with a metallic reinforcement comprising a truss similar in construction and arrangement to the reinforcement 95, and the lower edge of the beam 97 is beveled as is also the lower edge of the beam 93, for producing cutting edges.

Each of the side and end walls of the working chamber is formed with panels 98—98 producing arches 99—99 which serve as stiffening trusses for the walls. The meeting ends of said arches 99—99 for each side and each end are formed integral, and all of the ends of said arches are connected by a chord or beam 100 formed integral with the side and end walls. Embedded in the intrados of the arches 99 is a metallic reinforcement 101 consisting of a truss made up of metallic members connected by an open-work web consisting of diagonally positioned bars. The beam 100 is integral with the side wall and terminates in a cutting edge, the wall at the point of the beam 100 being provided with a metallic reinforcement 102, said metallic reinforcement 102 being constructed similarly to the reinforcement 101, except that the reinforcement 102 is straight instead of being formed in the shape of an arch. The metallic reinforcement 95 in the transverse beam 93 and the metallic reinforcement in the longitudinal beam 97 may be of any type desired, but by preference the same are constructed similarly to the metallic reinforcement 102.

Each corner produced by the juncture of a side wall with an end wall and with the roof is filled with a trihedral angular filling 103 which is formed integral with the roof, side and end walls. A similar filling 104 is provided for each corner produced by the juncture of each of the arches 92 and 96, with the respective end and side walls and with the roof. A like filling 105 is also provided for each corner produced by the juncture of the arches 92 with the arches 96 and with the roof 76. The said fillings tend to strengthen and stiffen the arches, and by preference the fillings 105 are somewhat elongated, as is apparent in Fig. 19.

In Figs. 23 to 28 inclusive, I have illustrated a further embodiment of the present invention. In this embodiment the usual relatively thin inclosing walls are employed, consisting of the side walls 106—106 and end walls 107—107. The roof 108 is cast integral with said walls intermediate the length thereof so as to produce a working chamber below and a coffer dam above. The coffer dam is provided with a plurality of longitudinal trusses 109—109 and a plurality of transverse trusses 110—110, each of said trusses being made up of a single arch or a plurality of arches In the present embodiment, the longitudinal trusses are each formed of three arches, the inner haunches of the end arches and the haunches of the intermediate arch being formed integral with the crown of the arches forming trusses 110, the ends of the arches 109 of each longitudinal truss being tied together by a chord or roof beam 109', and each of said trusses 110 being made up of a single arch having its ends tied together by a chord or roof beam 113. Each of the side walls 106 is strengthened by a series of arches 111 constituting a longitudinal wall truss formed integral with the side walls, so as to produce the panels 106'—106'. The ends or imposts of the arches 111 are tied together by chords or longitudinal roof beams 112—112, and the arches 110 have their ends formed integral with the walls 106 at the points of juncture with the haunches of the arches 111. Each of the end walls of the coffer dam is strengthened by a transverse wall arch 114 formed integral with the wall, each arch 114 having its ends tied together by a transverse roof beam 115. Each arch 114, of course, produces a panel 107'. Suitable longitudinal and transverse minor roof beams 116—116 may be provided as found desirable. The roof beam is preferably provided at several points by apertures 117 for admission of the spoil and man shafts, the material of the roof being preferably thickened about the edge of the apertures.

The working chamber is provided with longitudinal bracing trusses and transverse bracing trusses, each of the longitudinal trusses being made up of a series of arches 118 having their ends tied together by a longitudinal beam or chord 119. The ends of each of the longitudinal trusses are, of course, formed integral with the respective end wall 107. The transverse bracing trusses each consists of a transversely arranged arch 120 and has its ends tied together by a transverse beam or chord 121, the ends of the transverse trusses, of course, being formed integral with the side walls. The side walls of the working chamber are braced by longitudinal wall trusses, and the end walls by transverse wall trusses, said wall trusses being formed integral with the respective walls and each of the side wall trusses consisting of a series of arches 122 having their ends tied together by a longitudinal beam or chord 123 formed integral with the respective side walls. Each of the said arches 122, of course, produces the usual wall panel 106″. Each of the end wall trusses is made up of a transverse arch 124 having its ends tied together by a transverse chord or beam 125. The arch 124, of course, produces the usual panel 107″. Each chord or beam 123 and each chord or beam 125 extends to the lower edge of its respective wall and is beveled outwardly for producing a cutting edge. Each of the chords 121 and 119 is double-beveled for producing a cutting edge.

In Figs. 29, 30 and 31, I have illustrated a further embodiment of the present invention, all of the details of construction being the same as described with respect to Figs. 23 to 28, inclusive, except that the wall panels are slightly different in construction. The same reference numerals have been applied to Figs. 29, 30 and 31 as are employed with respect to Figs. 23 to 28 inclusive, and the same description will apply. Each of the panels 106″ in the structures seen in Figs. 29 to 31, inclusive, is, as clearly seen in Fig. 31, formed of a series of horizontal arches 106ª, each of said arches being of a thickness sufficient for extending from the respective beam 123 to the soffit of the respective arch. The panel 106″ formed by each arch 122 is thus provided with a series of vertical posts extending from the chord to the soffit of the respective arch. Each of the end arches 124 has its respective panel 107″ divided into similar minor arches, as indicated at 107ª. It is, of course, obvious that the arch structures provide for reducing the amount of material required without materially lessening the strength of the structure.

In Figs. 32 to 35 inclusive, I have illustrated a further embodiment of the present invention, which is especially designed for use in establishing foundations for walls of office buildings and the like. The caisson is therefore built comparatively narrow and does not require longitudinal and transverse trusses in the working chamber. In this embodiment, I have illustrated the side walls 126—126 and end walls 127—127 as being comparatively thin and strengthened by arch trusses. Each of the longitudinal wall trusses consists of a pair of arches 128 having their ends tied together by a longitudinal chord or beam 129, the said beam and arches being formed integral with the respective side wall for producing panels 130—130. The truss for each end wall consists of a transverse arch 131 having its ends tied together by a transverse chord or beam 132 producing an end panel 133, the beam and arch being formed integral with the wall. Continuous knee-braces 134 extend along the soffit of the arch 131 and along the top surface of the chord 132, the said knee-braces being formed integral with the arch and chord and with the end wall. The inclosing walls 126 and 127 are formed integral with the roof 135, formed with a central shaft-receiving aperture 136. The roof is preferably suitably thickened at the point of the aperture 136 and is provided with transverse roof beams 137—137 extending from one side to the other of the casing. Each of the roof beams 137 is crowned, as clearly seen in Figs. 34 and 35, or, in other words, formed in the shape of an arch for aiding in distributing the strains. The roof between the end walls and the beam 137, and between the beam 137 and the thickened portion for aperture 136, is made up of roof slabs 138 which are crowned or formed arch shaped, as clearly seen in Fig. 33. The roof is further strengthened and stiffened by knee-braces 139—139 arranged centrally of and beneath the roof and being formed integral with the roof and with the respective side walls, or perhaps, more properly, with the meeting haunches of the arches, 128.

In Figs. 36 and 37 I have illustrated another embodiment of the invention especially adapted for small caissons which may be used for establishing foundations for column footings for office buildings, for cylindrical piers for light bridges, and for similar purposes. This caisson consists of a cylindrical inclosing wall 140, provided with an integral roof 141 having a single cylindrical shaft opening 142. The roof 141 is stiffened and strengthened by knee-braces 143—143 which are formed integral with said roof and with the wall 140. The wall 140 is formed with a series of panels 144—144 producing horizontal arches similar in construction and arrangement to arches seen in Fig. 31. The meeting ends of the arches constituting the panels 144 produce the vertical posts with which the knee braces 143 are connected.

In Figs. 38 to 41 inclusive, I have illustrated a further modified form of caisson in which no longitudinal trusses are employed in the working chamber. The usual side walls 145—145 and end walls 146—146 are employed and are provided with a roof 147 forming a working chamber below and a coffer dam above. The coffer dam is provided with a central, longitudinal truss 148 and a transverse truss 149. The truss 148 is provided with top and bottom chords, the latter being distinct from and integral with the roof, as seen in Figs. 39 and 40, said chords being connected by vertical posts and inclined web members, as seen in Fig. 39, with end posts formed integral with the coffer dam end walls. The transverse truss 149 is constructed somewhat similarly to the truss 148, and is arranged centrally of the coffer dam. Truss 149, of course, intersects the longitudinal truss, and is provided with a vertical post in common with the longitudinal truss at the point of intersection. The transverse truss is also provided with end posts formed integral with the side walls.

Each of the sides of the coffer dam is provided with a side wall truss similar in general design to the longitudinal truss 148, the wall truss not being seen in Fig. 39, as its outline is the same as the truss seen in section therein. Each of the end walls of the coffer dam is formed with a stiffening truss consisting of an upper and a lower chord tied together at its ends by the end posts of the side wall trusses and tied together at its center by the end post of the longitudinal truss 148.

The roof 147 is stiffened by horizontally disposed roof trusses 149'—149', each consisting of one of the lower chords of one of the wall trusses, and the lower chord of the central longitudinal truss connected by straight and diagonal posts or webs, said posts or webs being formed integral with the roof.

The working chamber is provided with two compartments formed by transverse bulk head 150. The walls of each of the compartments are strengthened and stiffened by wall trusses each made up of an integral arch 151 and a chord 152 tying the ends of the arch together. Each arch is further strengthened by a knee-brace 153 formed integral with the crown of the arch and with the respective well. The upper edge of the chord 152 is also connected with its respective wall by knee-braces 154—154. Only a few of the knee-braces 153 and 154 are illustrated, but of course, it is obivous that as many knee-braces may be employed for connecting the soffit of the arch with the wall and connecting the chord with the wall, as are found desirable. The chords 152 formed integral with the side and end walls 145 and 146, respectively, are beveled outwardly, and the chords 152, which are formed integral with the bulk head 150 are beveled toward the bulk head, so that the lower edges of said chords and bulk head constitute a cutting edge. It is obvious that this particular embodiment is adapted for large caissons, the increase of area of the caisson being accommodated by additional bulk heads.

In Figs. 42 and 43, I have illustrated a further modified form of caisson, the structure being such that a top plan view of the same would appear substantially the same as the disclosure in Fig. 38. In connection with this embodiment, I have illustrated a fragment of a wooden coffer dam. In this embodiment the side walls 155—155 and end walls 156—156 are formed integral at their upper edge with the roof 157, so that no coffer dam chamber is produced. The working chamber formed by said side and end walls and roof has its side and end walls strengthened by arches 158—158 formed integral with the respective side and end walls. The side wall arches 158 have their ends connected by the longitudinal chords 159 formed integral with the side walls, and the end wall arches 158 have their ends tied together by transverse chords 160 formed integral with the end walls. Each of the arches 158 is also connected to the respective side or end wall by a knee-brace 161 formed integral with the respective arch at the point of its crown, and also formed integral with the wall. The upper edge of each of the chords 159 and 160 is connected with the respective wall by knee-braces 162—162 formed integral with the respective wall and chord. Arranged centrally of the working chamber is a transverse arch 163 having its ends tied by a transverse beam 164. Above the roof 157 and resting on the side and end walls may be arranged a wooden or other suitable coffer dam 165 which is stiffened and held in place by longitudinal side trusses 166—166 and transverse end trusses 167—167. Each of the trusses 166 consists simply of a series of arches having their ends tied by a longitudinal chord 168, said chords 168 being formed integral with the upper edge of the truss formed by arches 158—158. The transverse arches 167 have their ends tied by a transverse chord 169 formed integral with the truss produced by the lower transverse arch 158. The trusses 166 and 167 are approximately of the same thickness as the trusses produced by the arches 158, so that a ledge the thickness of the walls 155 and 156 is left upon which the coffer dam 165 may rest. Each of the arches of the trusses 166 is preferably strengthened by a vertical post 170 formed integral with the respective chord 168 and extending to and being formed integral with the soffit of the crown of the arch. The transverse truss 167 is similarly strengthened and stiffened by the vertical post 171. The side trusses 166 are preferably further strengthened by transverse intermediate braces 172—172, and the end trusses 167 are strengthened by a longitudinal, central brace 173, the brace 173 being formed of a truss similar to truss 148.

In Figs. 44 to 49, inclusive, I have illustrated a further embodiment of the present invention involving the usual side walls 174—174 and end walls 175—175, and the roof 176 formed integral with the side and end walls, said roof being arranged intermediate the length of the inclosure formed by said side and end walls, and thereby producing a working chamber below and a coffer dam above. The working chamber is provided with a longitudinal truss consisting of a series of arches 177 having their ends tied together by a longitudinal chord 178 and each having its crown formed integral with the roof. The working chamber is further provided with a transverse truss centrally of its length, consisting of an arch 179 having its ends tied by a transverse chord 180, the chords 178 and 180 intersecting at the center of the caisson, and each of said chords being beveled at their lower edges for producing a cutting edge. The crown of the arch 179 is formed integral with the roof. Each side wall 174 is strengthened and stiffened by a longitudinal truss formed integral therewith and which consists of a series of arches 181 having their inner ends tied together by a longitudinal chord or beam 182, which is formed integral with the respective sides. The end walls 175 are provided with end trusses, each constructed of a series of relatively small arches 183 having their ends connected by a transverse chord 184 formed integral with the respective end walls. Each of the arches 181 and 183 is preferably constructed with its crown formed of a part of the roof 176.

The coffer dam is provided with transverse trusses 185—185 each consisting of an upper and a lower chord, the lower chord being formed integral with the roof 176, and the said chords being tied together by vertical posts 186, arranged preferably midway between the side walls and the middle of the respective trusses. A longitudinal truss 187 extends for the full length of the coffer dam and intersects trusses 185 at their middles, said trusses 185 being formed integral with the trusses 187 at the points of intersection. The truss 187 is made up simply of an upper chord and a continuous integral web formed integral with said chord and with the roof 176. Each of side walls 174 is strengthened by a longitudinal truss 188 which is formed integral with the respective side wall and which consists of a series of arches, preferably larger than the arches 181, and having their ends tied together by a longitudinal chord formed integral with the roof. The end walls 175 are stiffened by similar trusses 189, and the roof is further strengthened by longitudinal roof beams 190—190, and by transverse roof beams 191—191, the spaces blocked off by beams 190 and 191 being preferably formed in the shape of roof slabs 192, which are arched or crowned as clearly seen in Figs. 45 and 48. At suitable points the blocked-off portions of the roof may be thickened as at 193—193 and formed with shaft-receiving apertures 194—194.

In Figs. 50 to 53, inclusive, I have illustrated another embodiment of the present invention, in which I employ the usual side walls 195—195 and end walls 196—196 formed integral with the roof 197, and providing an inclosure into a coffer dam above and a working chamber beneath. The side walls 195 of the coffer dam are each stiffened and braced by a longitudinal wall truss formed integral with the wall and made up of a single arch 198, having its ends tied by a longitudinal chord 199. The intrados of the arch 198, instead of being curved, is formed of a series of chords of minor arcs. In practice, ordinarily, wooden forms are used in the production of the arch, and by providing the straight intrados, instead of curved, the expense and labor of curving the forms are obviated. If metallic forms are employed, the curves may be produced perhaps as easily as straight lines, and therefore the arch will be made on a continuous curve or with straight portions according to the type of form employed. Of course, this applies with equal force to all of the arches hereinbefore disclosed, as in practice, the most economical construction of arch will be followed. The crown of the arch 198 is formed integral with the vertical post 200, which extends down to and is formed integral with a longitudinal chord 199. At each side of the post 200 and spaced suitable distances therefrom are posts 202—202 which extend from the chord or beam 199 to and are formed integral with the soffit of the arch 198. Each of the posts 202 is connected with the post 200 by a horizontal brace or strut 203, provided with knee braces at each end and the arch is further strengthened by inclined braces 204 extending from the beam 199 at the foot of each of the posts 202 up to the soffit of arch 198, and each of the inclined braces 204 is provided at each end with knee-braces for strengthening the parts. The roof 197 is stiffened by a longitudinal roof beam 201 which is formed integral with the roof, and the roof is further strengthened and stiffened by transverse roof beams 205—205, formed integral with the roof. The roof is provided with a shaft opening 206 and at the point of said opening, the roof is strengthened by a crowned thickened portion 207. The walls of the coffer dam are strengthened by transverse struts 208—208, but no longitudinal braces or struts are employed. The end walls of the coffer dam are each strengthened by a transverse arch 209 having its ends tied together by a transverse chord 210 formed integral with the end wall. A vertical post 211 connects the crown of the arch 209 with the chord 210 at the point of juncture of the said chord with the longitudinal roof beam 201. Transverse, horizontal braces 212—212 connect the post 211 with the arch 209 near the ends thereof, and each brace 212 is provided with knee braces at each end.

The working chamber has its walls braced by transverse struts 213—213 and the side walls are so strengthened and stiffened by longitudinal trusses formed integral with the walls, each of said trusses consisting of an arch 214, whose crown is formed from the roof 197, said arch having its ends connected by a longitudinal beam 215. The arch is stiffened and strengthened by a central, vertical post 216 and side posts 217—217. Suitable, inclined braces 218—218 connect the chord 215 with the soffit of the arch 214, and each brace 218 is provided with knee braces at each end. Each of the end walls of the working chamber is strengthened by transverse trusses formed of an arch 219 having its ends tied by a transverse chord 219', the chord and arch being connected by the central, vertical post 220 and diagonal braces 221—221. Each diagonal brace 221 is provided with knee braces at each end. The roof 197 is provided with arches 222—222 which may be used in any of the structures above described, when desired.

In Figs. 54 to 58 inclusive, I have shown an embodiment of the present invention, particularly designed for the heaviest form of caisson work, though of course this structure is suitable for lighter work also, the various members of the caisson being proportioned in size according to the load which must be borne. The usual side walls 223 and end walls 224 are employed, a roof 225 being provided and formed integral with side and end walls, intermediate the length thereof, so as to provide a coffer dam above and a working chamber below. The end walls of the coffer dam are braced by a single, central, longitudinally arranged inclined web member truss 226, the top and bottom chords of said truss being enlarged to a greater thickness than the inclined web members and the bottom chord being formed integral with the roof. The side walls of the coffer dam are braced by two inclined web member trusses 227—227, and the roof is strengthened by longitudinal, relatively wide roof beams 228—228 connecting the end walls and intersecting the transverse trusses 227. At the points of intersection said beams 228 are provided with knee-braces 229 formed integral with the transverse trusses and with the respective beam. The roof is further strengthened by transverse, relatively wide roof beams 230—230, which intersect the longitudinal truss 226, each of said roof beams 230 at the point of intersection being provided with knee-braces 231—231, which knee-braces are formed integral with the longitudinal truss and with the respective roof beam. The same form of knee braces are provided at the ends of the beams 228 and 230 for connecting the same to the respective walls. The roof 225 is thus divided into blocks and each of the same is preferably crowned, as at 232. Each of the side walls of the coffer dam is braced by a wall truss extending throughout the length of the same and formed integral therewith, each of said wall trusses being made up of a series of arches 233, formed integral with a series of inverted arches 234. The crown of each arch 233 is tied to the crown of the corresponding arch 234 by a vertical post 235, which post is preferably provided with knee-braces 236 at its upper end. The span of the arches 233 is shown as relatively narrow, but the same may be of any desired size and while the two arches in the structure illustrated produce a circle, it is obvious that the span may be varied and the rise altered so that instead of describing a circle, the two arches together will be elliptical or parabolical, or of other form, as desired. This is also true of all of the arches hereinafter described. Each of the end walls of the coffer dam is strengthened by a transverse truss formed integral with the respective wall and made up of a pair of arches 237—237 formed integral with the pair of inverted arches 238—238, the crown of each arch 237 being connected with the crown of the corresponding arch 238 by a vertical post 239. The ends of the post 239 are provided with knee-braces 240.

The working chamber is provided with a single longitudinal inclined web member truss 241 arranged immediately below the truss 226. It is to be observed from the showing in Fig. 55, that some of the vertical posts of the truss 241 are not in line with some of the vertical posts of the truss 226. It is, of course, ordinarily preferable to have the vertical posts of the chamber trusses in vertical alinement with the vertical posts of the coffer dam trusses, but such an arrangement is not absolutely necessary. Transverse web member trusses 242 are arranged within the working chamber in vertical alinement with the trusses 227. Each of the side walls of the working chamber is strengthened and stiffened by a longitudinal wall truss integral with the wall, which is formed of a series of arches 243 formed integral with corresponding inverted arches 244, the arches 243 and 244 having a relatively short span. It is, of course, obvious that said arches may be given any desired span. The arches 243 have their crowns formed of the roof 225, but it is, of course, obvious that the crowns may be made independent of the roof if desired. The end walls of the working chamber are strengthened by transverse wall trusses formed integral with the walls, each of said trusses consisting of a series of arches 245 formed integral with the corresponding inverted arches 246, the arches 245 and 246 being substantially the same in structure and arrangement as the arches 243 and 244, except that as illustrated, arches 245 have their crowns formed independently of the roof 225 and cast integral therewith.

To those skilled in the art, it will be obvious that while I have illustrated numerous modifications, the generic conception is seen in all, and in each a novel feature is seen distinct from the novel features of the other modifications, and therefore all of the novel features of the several modifications may be incorporated in a single structure, the several distinct structures being shown in order to simplify the disclosure and enable a more ready understanding of each feature of invention.

Furthermore, I have illustrated various forms of braces within the coffer dam and within the working chamber, which I do not claim in detail herein, as the same are made the subject of claim in my other co-pending applications. This statement is not to preclude the interpretation of the generic claims herein so as to include said braces.

Having thus described my invention, what I claim as new and desire to secure by Letters Patent is:

1. In a caisson, the combination with inclosing walls and a roof, of an arched brace portions of which are structurally independent of said roof disposed for strengthening some of said parts.

2. In a caisson, the combination with inclosing walls and a roof, of a truss portions of which are structurally independent of said roof for strengthening some of said parts, one of the members of said truss being arched.

3. In a caisson, the combination with inclosing walls, of a trussed arch connected therewith for strengthening said walls.

4. In a caisson, the combination with inclosing walls, of a truss formed integrally therewith for strengthening the walls, said truss having one of its members arched.

5. In a caisson, the combination with inclosing walls, of a strengthening truss formed integral with one of said walls throughout the length of the truss, one of the members of the truss being arched.

6. In a caisson, the combination with inclosing walls, of a wall truss extending parallel to one of said walls and connected therewith, one of the members of said truss being arched.

7. In a caisson, the combination with inclosing walls, of an arch having one of its flat faces extending parallel to one of said inclosing walls and connected with said wall, and means tying the ends of said arch together.

8. In a caisson, the combination with relatively thin inclosing walls, of wall trusses extending substantially continuously about said walls and connected therewith, each of said trusses comprising an arch, and means tying the ends of the arch together.

9. In a caisson, the combination with inclosing walls, of an arch cast integral with one of said walls, and a chord connecting the ends of the arch and cast integral therewith.

10. In a caisson, the combination with inclosing walls, of a truss extending along one of said walls and connected therewith, said truss comprising a series of arches connected together.

11. In a caisson, the combination with inclosing walls, of a truss extending along one of said walls and connected therewith, said truss comprising a series of arches connected together, and a chord tying all of the ends of said arches together.

12. In a caisson, the combination with inclosing walls, of a truss extending along each of said walls and connected to the respective wall, each of said trusses having one of its members arched.

13. In a caisson, the combination with inclosing walls, of a series of trussed arches extending substantially continuously about all of the said walls and connected therewith.

14. In a caisson, the combination with inclosing walls, of arches extending substantially continuously about all of said walls and connected therewith, and means connected with said walls for tying the ends of said arches together.

15. In a caisson, the combination with an inclosing wall, of an arch extending along one of said walls and connected therewith, a chord connecting the ends of said arch, and a post connecting said chord with the arch.

16. In a caisson, the combination with inclosing walls, of an arch extending along one of said walls and connected therewith, a chord tying the ends of said arch together, and posts spaced apart and connecting said chord with the soffit of the arch.

17. In a caisson, the combination with inclosing walls, of a truss arranged for strengthening the same, said truss comprising an arch, a chord connecting the ends thereof, and intermediate bracing means connecting the chord with the arch.

18. In a caisson, the combination with inclosing walls, of a truss connected therewith for strengthening the same, said truss comprising an arch, a chord connecting the ends thereof, a post connecting said chord with the crown of said arch, posts spaced from the first-mentioned post and connecting the chord with the soffit of the arch, and an inclined brace connecting the last mentioned posts with the first-mentioned posts.

19. In a caisson, the combination with inclosing walls, of an arch connected therewith for strengthening the same, and reinforcing means arranged in the intrados of said arch.

20. In a caisson, the combination with concrete inclosing walls, of a concrete arch formed integral therewith for strengthening the same, and a metallic reinforcement embedded in the intrados of the arch.

21. In a caisson, the combination with inclosing walls, of a truss connected therewith for strengthening the same, said truss comprising a concrete arch, a concrete chord connecting the ends of said arch, a metallic reinforcement embedded in the intrados of said arch, and a metallic reinforcement embedded in said chord.

22. In a caisson, the combination with concrete inclosing walls, of a concrete arch for strengthening the same formed integral therewith, and a metallic truss embedded in the intrados of said arch.

23. In a caisson, the combination with concrete inclosing walls, of a concrete arch formed integral therewith, a concrete chord tying the ends of said arch together, a metallic truss embedded in the intrados of said arches, and a metallic truss embedded in said chord.

24. In a caisson, the combination with inclosing walls, of a truss extending along one of said walls and formed integral therewith, comprising an arch and a concrete chord tying the ends of said arch together, said chord being formed at its lower edge into a cutting edge.

25. In a caisson, the combination with inclosing walls, of a plurality of tiers of wall trusses connected to one of said walls, each of said trusses comprising an arch.

26. In a caisson, the combination with inclosing walls, of a plurality of tiers of trusses arranged for bracing said walls, each of said trusses comprising an arch, and means for connecting the ends thereof together.

27. In a caisson, the combination with concrete inclosing walls, of a plurality of tiers of concrete trusses cast integral with said walls, each of said trusses comprising an arch, and a chord tying the ends of the arch together.

28. In a caisson, the combination with inclosing walls and a roof dividing the inclosure into a coffer dam and working chamber, of an arch brace in said working chamber.

29. In a caisson, the combination with inclosing walls and a roof dividing the inclosure into a working chamber and a coffer dam, of an arched brace within said working chamber and an arched brace within the coffer dam.

30. In a caisson, the combination with inclosing walls and a roof dividing the same into a working chamber and a coffer dam, of a truss arranged for strengthening one of the coffer dam walls, one of the members of the truss being arched.

31. In a caisson, the combination with inclosing walls and a roof dividing the inclosure into a working chamber and a coffer dam, of a truss in said working chamber arranged to strengthen one of the walls thereof, said truss having one of its members arched.

32. In a caisson, the combination with inclosing walls and a roof dividing the same into a working chamber and a coffer dam, of a truss for strengthening one of the walls of said working chamber, and a truss for strengthening one of the walls of said coffer dam, each of said trusses being formed from a series of arches.

33. In a caisson, the combination with inclosing walls and a roof, of an arched roof beam connected with some of said walls and said roof.

34. In a caisson, the combination with inclosing walls and a roof, of a transverse roof beam formed integral with the roof and with some of said walls, said roof beam being formed with its upper surface arched.

35. In a caisson, the combination with concrete inclosing walls and a roof formed integral therewith, of concrete roof beams formed integral with some of said walls and integral with the roof, each of said beams being formed with its upper surface arched.

36. In a caisson, the combination with an inclosing wall, of a truss connected therewith and comprising upper and lower chords, and an arch having its axis vertical, said arch extending from the lower chord to the upper chord.

37. In a caisson, the combination with inclosing walls, of a truss connected with one of said walls, said truss comprising an arch, a chord connecting the ends of said arch, posts connecting the said chord with the soffit of said arch, and arches springing from and connecting said posts.

38. In a caisson, the combination with inclosing walls, of an arch connected with one of said walls, and an arch arranged at right angles to the first-mentioned arch and extending from the springing line of the first-mentioned arch to the soffit thereof.

39. In a caisson, the combination with inclosing walls, of an arch connected with one of said walls and having a horizontal axis and a plurality of arches each having a vertical axis arranged between the ends of the first-mentioned arch and extending to the soffit of said first-mentioned arch.

40. In a caisson, the combination with the inclosing walls of an arch connected therewith, such arch having a substantially horizontal axis, a chord tying the ends of the arch, and a plurality of arches connected with the chord each having a substantially vertical axis, said arches last mentioned extending from the chord to the soffit of the arch first mentioned.

41. In a caisson, the combination with inclosing walls, of a roof comprising a plurality of arched roof slabs, and means connecting the same together.

42. In a caisson, the combination with a concrete wall, of a concrete roof formed integral therewith, said roof comprising a plurality of crowned roof slabs suitably connected together.

43. In a caisson, the combination with inclosing walls, and a bulk head dividing the walls into compartments, of arches formed integral with said walls and with said bulk head.

44. In a caisson, the combination with inclosing walls and a bulk head dividing the same into compartments, of an arch formed integral with said bulk head for stiffening the same.

45. In a caisson, the combination with inclosing walls and a bulk head dividing the same into compartments, of arches on opposite sides of said bulk head and formed integral therewith.

46. In a caisson, the combination with inclosing walls and a bulk head dividing the same into compartments, of arches extending along the opposite sides of said bulk head and formed integral therewith, and chords formed integral with said bulk head and tying the ends of said arches together.

47. In a caisson, the combination with a structure including an inclosing wall, of an arched brace disposed within said wall, one side face of the arched brace being free from contact with the inclosing portions of said structure and a bracing member extending at an angle with the arched brace and communicating strains through the medium of the arched brace to all portions of the wall adjacent to the side of the arched brace opposite to the aforesaid free side.

48. In a caisson, the combination with a structure including an inclosing wall, of an arched brace disposed therein, one side face of the arched brace being free from contact with the inclosing portions of said structure and extending in a direction substantially perpendicular to those portions of the wall having connection with the ends of the brace and a bracing member extending at an angle with the arched brace and communicating strains through the medium of the arched brace to all portions of the wall adjacent to the side of the arched brace opposite to the aforesaid free side.

49. In a caisson, the combination with an inclosing wall, of an arch arranged for strengthening said wall, and a knee-brace formed integral with said wall and with the soffit of said arch.

50. In a caisson, the combination with an inclosing wall, of an arch arranged for stiffening the same, a chord tying the ends of said arch together, and a knee-brace formed integral with said inclosing wall and said chord.

51. In a caisson, the combination with a concrete inclosing wall, of a concrete knee-brace arranged to strengthen said wall, and a metallic reinforcement for said knee-brace.

52. In a caisson, the combination with a concrete inclosing wall, of a concrete knee-brace arranged for strengthening the same, and a triangular angle iron reinforcement embedded in said knee-brace.

53. In a caisson, the combination with concrete inclosing walls, of a concrete knee-brace formed integral therewith, and a triangular metallic reinforcement for said knee-brace, the said triangular reinforcement being provided with stiffening bars leaving bonding openings.

54. In a caisson, the combination with an inclosing wall forming a working chamber, of a coating of mortar for said chamber adapted for preventing the escape of air under pressure.

55. In a caisson, the combination with an inclosing wall forming a working chamber, of a tubular device extending through said wall, and a layer of mortar surrounding said device and extending therefrom in a continuous layer about the inner walls of the working chamber.

56. In a caisson, the combination with an inclosing wall, of a tube extending through said wall, a layer of mortar surrounding said tube, a clamp engaging said tube and supporting means for engaging said clamp and extending into the said wall.

57. In a caisson, the combination with an inclosing wall, of a shaft opening therefor, a layer of mortar surrounding said shaft opening, and a shaft mounted on the wall and resting upon said layer of mortar.

58. In a caisson, the combination with an inclosing wall forming a working chamber and having a shaft opening, of a shaft resting upon said wall immediately above said opening, a layer of non-porous material interposed between said shaft and said wall, and means for securing the shaft to the wall.

59. In a caisson, the combination with a concrete inclosing wall having a shaft opening, of a shaft resting upon said wall at the point of said opening, a frame connected with said shaft and shaped to conform to the contour of said opening, the said frame being formed of angle material, a frame embedded in the material of the wall and surrounding said opening, and means connecting the first-mentioned frame with the second-mentioned frame.

60. In a caisson, the combination with a concrete inclosing wall formed with a shaft opening, of a shaft connected with said wall at the point of the opening, a frame embedded in the wall and surrounding the opening, and means connecting the shaft with the said frame.

61. In a concrete caisson, the combination with an inclosing wall, of a brace connected therewith for strengthening the same, said brace comprising an arch and means for preventing the spreading of the ends of said arch apart.

62. In a concrete caisson, the combination with an inclosing wall, of a brace for strengthening the same, said brace comprising an arch and means connecting the ends thereof for preventing approach of the ends toward each other or separation thereof.

63. In a concrete caisson, the combination with an inclosing wall, of a concrete arch connected therewith for strengthening the same, and means for resisting shearing strains upon the arch.

64. In a concrete caisson, the combination with an inclosing wall, of a concrete arch arranged for strengthening the same, and means embedded in the intrados of the arch for resisting shearing strains.

65. The combination with inclosing walls, of a truss connected therewith for strengthening the same, said truss comprising an arch, a chord connecting the ends thereof, posts connecting said chord with the arch, a brace connecting said posts, and knee braces at the ends of the brace and connecting the brace with the posts.

66. In a caisson, the combination with inclosing walls, of a truss connected therewith for strengthening the same, said truss comprising an arch, means connecting the ends of the arch, an inclined brace extending from the connecting means to the soffit of the arch, and knee braces at the ends of said inclined brace connecting the same with the arch and with the connecting means.

In testimony whereof I affix my signature in presence of two witnesses.

OLIVER CROMWELL EDWARDS, Jr.

Witnesses:
DAN W. CHAMBERLIN,
PERCY E. TICHENOR.

Copies of this patent may be obtained for five cents each, by addressing the "Commissioner of Patents, Washington, D. C."